(12) United States Patent
Lund-Laverick et al.

(10) Patent No.: US 11,592,001 B2
(45) Date of Patent: Feb. 28, 2023

(54) WIND TURBINE BLADE AND A METHOD OF MANUFACTURING THE WIND TURBINE BLADE

(71) Applicant: LM WIND POWER INTERNATIONAL TECHNOLOGY II APS, Kolding (DK)

(72) Inventors: Michael Lund-Laverick, Aarup (DK); Lars Nielsen, Skanderborg (DK)

(73) Assignee: LM WINDPOWER INTERNATIONAL TECHNOLOGY II APS, Kolding (DK)

( * ) Notice: Subject to any disclaimer, the term of this patent is extended or adjusted under 35 U.S.C. 154(b) by 363 days.

(21) Appl. No.: 16/629,713

(22) PCT Filed: Jul. 13, 2018

(86) PCT No.: PCT/EP2018/069110
§ 371 (c)(1),
(2) Date: Jan. 9, 2020

(87) PCT Pub. No.: WO2019/012119
PCT Pub. Date: Jan. 17, 2019

(65) Prior Publication Data
US 2020/0386203 A1  Dec. 10, 2020

(30) Foreign Application Priority Data
Jul. 13, 2017 (EP) ..................... 17181167

(51) Int. Cl.
*F03D 1/06* (2006.01)
*B29C 70/34* (2006.01)
(Continued)

(52) U.S. Cl.
CPC .......... *F03D 1/0675* (2013.01); *B29C 70/342* (2013.01); *B29C 70/547* (2013.01); *B29L 2031/085* (2013.01)

(58) Field of Classification Search
CPC .... F03D 1/0641; F03D 1/0675; F03D 1/0683; B29C 70/342; B29C 70/547; B29L 2031/085
See application file for complete search history.

(56) References Cited

U.S. PATENT DOCUMENTS 8,789,275 B2 * 7/2014 Esaki ................ B29C 70/443
29/889.71
10,479,034 B2 * 11/2019 Hansen .................. B29C 70/48
(Continued)

FOREIGN PATENT DOCUMENTS

CN  101137841 A  3/2008
EP  1162058 A1  12/2001
(Continued)

OTHER PUBLICATIONS

Campbell, Jr, Flake C. "Manufacturing Processes for Advanced Composites"; Dec. 31, 2016.
(Continued)

*Primary Examiner* — Justin D Seabe
*Assistant Examiner* — Sang K Kim
(74) *Attorney, Agent, or Firm* — Nath, Goldberg & Meyer; Jerald L. Meyer; Tanya E. Harkins

(57) ABSTRACT

This invention relates to a method of manufacturing a wind turbine blade and a wind turbine blade thereof. A central core element and a plurality of side core elements are sandwiched between first layers and second layers of a first fibre material. The central core element is spaced apart from the side core elements to form a first and a second recess. This sandwich structure is then impregnated with a first resin and cured in a first step. Layers of a second fibre material of a first and a second main laminate are laid up in the first and second recesses. The first and second main laminates are then impregnated with a second resin and cured in a second step.

15 Claims, 11 Drawing Sheets

(51) Int. Cl.
*B29C 70/54* (2006.01)
*B29L 31/08* (2006.01)

(56) References Cited

U.S. PATENT DOCUMENTS

| | | | | |
|---|---|---|---|---|
| 10,487,797 | B2* | 11/2019 | Hancock | B29D 99/0025 |
| 2010/0189973 | A1* | 7/2010 | Mikkelsen | B05B 3/1092 |
| | | | | 428/213 |
| 2015/0314537 | A1* | 11/2015 | Dahl | F03D 13/10 |
| | | | | 264/510 |
| 2016/0319801 | A1* | 11/2016 | Smith | B29C 70/547 |
| 2020/0263657 | A1* | 8/2020 | Badger | B32B 7/09 |

FOREIGN PATENT DOCUMENTS

| | | | |
|---|---|---|---|
| WO | 2014096002 | A2 | 6/2014 |
| WO | 2015096840 | A1 | 7/2015 |
| WO | 2015114098 | A1 | 8/2015 |

OTHER PUBLICATIONS

First Office Action and Search Report dated Mar. 2, 2021 corresponding to Chinese application No. 201880046384.7.

* cited by examiner

WIND TURBINE BLADE AND A METHOD OF MANUFACTURING THE WIND TURBINE BLADE

This is a National Phase Application filed under 35 U.S.C. 371 as a national stage of PCT/EP2018/069110, filed Jul. 13, 2018, an application claiming the benefit of European Application No. 17181167.2, filed Jul. 13, 2017, the content of each of which is hereby incorporated by reference in its entirety.

TECHNICAL FIELD

The present invention relates to a method of manufacturing a wind turbine blade, comprising the steps of laying up layers of a first fibre material in a mould, arranging core elements on top of said layers, further laying up layers of a first fibre material on top of the core elements, infusing said first fibre material and core elements with a first resin and curing said first resin to form a sandwich structure of the wind turbine blade, wherein main laminate components are arranged in recesses formed by the core elements attached to the sandwich structure to form a blade shell part.

The present invention further relates to such a wind turbine blade.

BACKGROUND

It is well-known that wind turbine blades for modern wind turbines have become larger and heavier in an effort to increase the energy production from the wind turbine. This is achieved by increasing the aerodynamic profile of the wind turbine blades and thus increasing the blade length. Increasing the size of the wind turbine blade also increases the aerodynamic and static loadings on the wind turbine blade, which in turn also requires larger and heavier hubs and nacelle main frames in order to transfer these loadings to the wind turbine tower.

For larger wind turbine blades, larger blade moulds are needed in order to manufacture the blade shell parts of these large wind turbine blades. This in turn increases the amount of materials needed to manufacture the blade shell and the load carrying structure arranged within the blade shell, thereby, further increasing the total manufacturing costs and time.

The wind turbine blade may be manufactured by laying up layers of a laminate of a fibre material in a blade mould, optionally after a gel coating have been applied to the moulding surface. Optionally, a core material may be arranged between a first set of layers of fibre material and a second set of layers of fibre material to form a sandwich structure. A resin is then introduced into the fibre material and the optional core material, and finally cured to form a first blade shell part with a desired aerodynamic profile. The process is then repeated for a second blade shell part. The two cured blade shell parts may then be joined together via an adhesive. The outer surfaces, optionally only the glue lines, of the blade shell may be worked into their finished shape and then coated to form the finished wind turbine blade.

EP 2934857 A2 discloses a two-step manufacturing process, wherein layers of a fibre material are initially laid up on the moulding surface after which core elements, trailing edge reinforcements and leading edge reinforcements are laid up. Further layers of fibre material are then laid up over the core elements and the trailing and leading edge reinforcements. A resin is then introduced and cured. A continuous main laminate of the wind turbine blade is afterwards arranged in a continuous recess formed by the core elements. The main laminate is then attached to the pre-cured blade part, e.g. by introducing a resin which is then cured.

EP 3086924 A1 discloses a single-step manufacturing process, wherein first layers of a fibre material and then core elements are initially laid up on the moulding surface. After which, layers of a first and a second main laminate are arranged in a first recess and a second recess formed by the core elements. Second layers of a fibre material are finally laid up over the core elements and further over the first and second main laminates. A resin is then introduced and cured. Permeable fabrics are further arranged on both sides of each main laminate in order to facilitate the resin flow into each main laminate.

EP 2788176 A1 discloses an alternative manufacturing process, wherein multiple blade shell portions are pre-manufactured separately using manufacturing moulds and then joined together in a joining mould. A pre-cured central portion comprises a central core element, a main laminate and further a first side core element located on each side of the central core element is initially placed in the joining mould. Other pre-cured portions comprising second side core elements are subsequently placed in the joining mould and then joined to each first core element using a vacuum infusion. Alternatively, the second side core elements may be laid up directly in the joining mould and then infused and cured.

EP 3099471 A1 discloses a two-step manufacturing process where layers of a first fibre material is laid up in a mould, infused with a first resin and then cured. Subsequently, layers of a second fibre material is laid up on the cured structure and infused with a second resin. The infused second fibre material is finally cured to form an integrated wind turbine blade.

EP 1162058 A1 discloses a manufacturing process of a composite structure having a hollow core material sandwiched between layers of a fibre-reinforced material, wherein resin can be infused uniformly and quickly due to the shape of the core material.

OBJECT OF THE INVENTION

An object of the invention is to provide a method and a wind turbine blade that solves the abovementioned problems.

Another object of the invention is to provide a method and a wind turbine blade that reduces the total manufacturing time.

Yet another object of the invention is to provide a method and a wind turbine blade that provides an improved lay-up of the main laminates.

DETAILED DESCRIPTION OF THE INVENTION

An object of the invention is achieved by a method of manufacturing a wind turbine blade, the method comprises the steps of:
  laying up a number of first layers of a first fibre material in a mould, the first layers defining an outer side surface of the wind turbine blade,
  arranging a number of core elements of a core material on top of said first number of layers,
  further laying up a number of second layers of the first fibre material on top of at least said number of core elements, the second layers defining an inner side surface of the wind turbine blade, infusing said layers of first fibre material and said core elements with a first resin, substantially curing said first resin to form a sandwich structure of the wind turbine blade, arranging a number of main laminate components in a corresponding number of recesses formed by said number of core elements, attaching said main laminate components to the sandwich structure to form a blade shell part of the wind turbine blade, characterised in that a central core element is arranged between least two side core elements, wherein said at least two side core elements are spaced apart from the central core element in a chordwise direction to form a first recess for receiving a first main laminate component and a second recess for receiving a second main laminate component.

This provides an improved method of manufacturing large wind turbine blades having a split main laminate or spar cap. This allows the blade shell part to be manufactured using a two-step process, wherein the load carrying structure and the rest of the blade shell part are manufactured in separate steps. This in turn allows for an improved lay-up process of the load carrying structure and thus a reduction in the total manufacturing time. This may also allow for optimised placement of the load carrying structure and/or optimised transfer of the shear web loadings.

The present method may advantageously be used to manufacture the aerodynamic portion of the blade shell in a first step and then manufacture at least the main laminates in a second step. Optionally, the adjoining shear webs or box beam may be manufactured together with the respective main laminate, thereby formed an integrated structure. The shear webs or box beam may be formed by one or more sub-elements joined together.

Initially, a blade mould is provided having a moulding surface shaped to form a pressure or suction side of the manufactured wind turbine blade. The moulding surface extends in a longitudinal direction from a first end, e.g. a blade root, to a second end, e.g. a tip end. The moulding surface further extends in a chordwise direction from a first edge, e.g. a leading edge, to a second edge, e.g. a trailing edge.

A number of first layers of a first fibre material are laid up on the moulding surface in the longitudinal and/or chordwise direction. Here, the generic term 'first fibre material' refers to any types of fibre materials used to form the sandwich structure. For example, one, two, three or more first layers may be arranged in a stacked configuration on the moulding surface. These first layers form an outer skin of the blade shell part. Optionally, a coating, e.g. a gel-coat, may be applied to the moulding surface before the lay-up of the first layers. This reduces the amount of post-moulding required and thus reduces the finishing time.

One or more central core elements are then positioned on the above first layers in a longitudinal direction. The central core elements may be arranged at a predetermined chord length measured from the leading or trailing edge. The central core elements may after curing of the first resin be used to guide the load carrying structure, if premanufactured or pre-stacked, into its correct position or as a side barrier during the lay-up, as described later.

One or more side core elements are further positioned on the above first layers on both sides of the central core elements. A number of first side core elements are spaced apart from the central core elements towards the leading edge to form a first recess extending in the longitudinal direction. A number of second side core elements are spaced apart from the central core elements towards the trailing edge to form a second recess extending in the longitudinal direction. This allows loads and stresses to be distributed in the blade shell part.

A number of second layers of the first fibre material are subsequently laid up on the above central and side core elements in the longitudinal and/or chordwise direction. The second layers further extend along the above first layers in the first and second recesses. For example, one, two, three or more second layers may be arranged in a stacked configuration. These second layers form an inner skin of the blade shell part, thereby enclosing the respective core elements.

After the lay-up, the second layers are covered with a bag material and a first resin is introduced into the fibre material using a VARTM (vacuum assisted resin transfer moulding) or RTM (resin transfer moulding) process. The first resin is then cured in a first step to form a sandwich structure of the blade shell part. In the respective recesses, the first and second layers form a combined laminate with an increased thickness. A first and a second main laminate is manufactured, as described later, and then attached to the above sandwich structure in a blade support cradle or in the blade mould. This allows the split main laminate to be accurately positioned and attached to the blade shell part, since the central core elements may be used to align each main laminate.

According to one embodiment, at least one of said first and second main laminate components comprises a plurality of layers of a second fibre material arranged in a stacked configuration, wherein said at least one of the first and second main laminate components is attached by infusing said layers of second fibre material with a second resin and then curing said second resin.

The first and/or second main laminate may be manufactured by arranging a plurality of layers of a second fibre material in a stacked configuration. Here, the generic term 'second fibre material' refers to any types of fibre materials used to form the main laminate. The lay-up of these layers may be performed in a main laminate mould or separate from the blade mould. The individual layers may be stitched or wrapped together using further fibres or otherwise held in place, either during or after the lay-up. This provides a dry stacked main laminate component which may then be positioned in the respective recess in the above sandwich structure.

The individual layers may alternatively be joined together with a thermoplastic binder or an adhesive or a resin arranged between the individual layers. Alternatively, the individual layers, e.g. the woven fabrics or individual rovings thereof, may be covered with said thermoplastic binder or adhesive so that the layers are in direct contact each other. The stacked layers may thus form a preformed or prefabricated main laminate component. These preformed or prefabricated main laminate components may then be positioned in the respective recess in the above sandwich structure.

Once positioned, the main laminate component may be covered with a bag material, and a second resin is introduced into the second fibre material using a VARTM or RTM process. The second resin is then cured to integrate the main laminate component into the blade shell part.

According to a special embodiment, said layers of the second fibre material is laid up directly in the first or second recess.

The lay-up process of the layers of the first and/or second main laminate may alternatively be performed directly in the respective recesses. The central core elements and the side core elements may thus function as side barriers during this lay-up process, thereby allowing for a more accurate lay-up of the individual layers. This also forms a dry stacked main laminate component.

Optionally, at least one layer of second fibre material may be laid up to extend over the central core element and further extend, partly or fully, over the first and second main laminates. This forms an intermediate skin or skin portions between the first and second main laminates, as mentioned later.

According to another special embodiment, at least one of said first and second main laminate components is manufactured separately from the wind turbine blade using a main laminate mould, and then attached to the sandwich structure using an adhesive.

Alternatively, the second resin may be introduced into the layers of the first and/or second main laminate after the lay-up in the main laminate mould to form a prepreg structure. This prepreged main laminate component may then be positioned in the respective recess in the sandwich structure and finally cured. The main laminate mould may have a moulding surface substantially corresponding to the shape of the respective recess formed in the sandwich structure. This allows the main laminate to be manufactured separately from the blade shell part, e.g. under controlled conditions.

The second resin may alternatively be cured to form a pre-manufactured structure when the first and/or second main laminate is still in the main laminate mould. This premanufactured main laminate component may then be positioned in the respective recess in the sandwich structure and attached by means of an adhesive arranged between the main laminate and the recess. The adhesive may in example be applied to the surfaces of the recess and/or to the corresponding surfaces of the main laminate before or after placement of the pre-manufactured main laminate component. For example, the adhesive may be a fluid adhesive or an adhesive tape or film.

The intermediate skin or skin portions may then be impregnated with the second resin and, optionally, cured in the main laminate mould before the main laminate components are positioned in the recesses.

According to one embodiment, the first resin is introduced into at least the layers of first fibre material via a central inlet channel located between said first and second recesses.

A number of inlets and outlets may be arranged on the inner surface of the above second layers before introducing the first resin. The individual inlets and outlets may each comprise an opening, e.g. an omega-shaped channel, configured to guide the first resin into or out of the first fibre material respectively. At least one central inlet channel may be arranged on the central core elements and at least one side inlet channel may be arranged on the side core elements. At least one outlet channel may be arranged on the central core elements and/or on the side core elements. This allows the first fibre material to be effectively impregnated with first resin.

Similarly, a number of inlets and outlets may be distributed over the inner surface of each of the first and second main laminates before introducing the second resin. Alternatively or additionally, the inlet(s) may be arranged on an intermediate skin or skin portions extending between the first and second main laminates, as described later. This allows the second fibre material to be effectively impregnated with second resin.

Alternatively, the inlet(s) may be arranged between the first and second main laminates and the outlet(s) may be arranged on the opposite sides of the first and second main laminates, or vice versa. Thereby, no inlets or outlets are arranged on the inner surfaces of the first and second main laminates. This also allows the second fibre material to be effectively impregnated with second resin.

The individual inlets and outlets may each comprise an opening, e.g. an omega-shaped channel, configured to guide the second resin into or out of the second fibre material respectively. The inlet(s) may be arranged towards a central line of the first or second main laminate while the outlet(s) may be arranged towards the opposite facing edges of the first or second main laminate, or vice versa. This allows the second fibre material to be effectively impregnated with second resin.

The first and second main laminates may be impregnated and/or cured simultaneously in one or more combined steps. Alternatively, the first main laminate may be impregnated and cured in a first sub-step and the second main laminate may be impregnated and cured in a second sub-step, or vice versa.

According to a further special embodiment, said first resin is introduced into the first fibre material via second flow channels integrated into the central core element.

The side core elements may comprise an integrated resin flow network configured to distribute the first resin over the surface area and allow the first resin to flow into the fibre material in both the first and second layers. For example, the flow network may be formed in the top side and/or in the bottom side of the side core elements. The individual grooves may be interconnected and extend in the longitudinal direction and/or in the chordwise direction. This facilitates the flow of first resin in the fibre material and reduces the risk of dry spots forming.

Similarly, the central core element may comprise an integrated resin flow network. For example, the resin flow network may be formed in the top side and/or in the bottom side of the central core elements. At least one central groove may extend in the longitudinal direction and may function as a central inlet for leading resin into the resin flow network. A plurality of side grooves may extend in the chordwise direction and be interconnected to the central groove. For example, the central groove may a cross-sectional profile which is greater than the cross-sectional profile of the side grooves. This further facilitates the flow of first resin through the fibre material and reduces the risk of dry spots forming.

According to a special embodiment, the second resin is introduced into at least the layers of second fibre material via a central inlet channel located between said first and second main laminate components.

In this alternative configuration, the central core elements may be partly or fully impregnated with the second resin together with the first and second main laminates. For example, the central core elements may be impregnated with a mixture of the first resin and the second resin. For example, the first layer portion of first fibre material abutting the central core elements and optionally the bottom side of the central core elements may be impregnated with the first resin and then cured in the first curing step. For example, the second layer portion of first fibre material abutting the central core element and optionally the top side of the central core elements may be impregnated with the second resin and then cured in the second curing step. This allows both main laminates to be impregnated with the second resin simultaneously using the above central inlet channel.

According to a further special embodiment, said second resin is introduced into the second fibre material via first flow channels integrated into the central core element.

The resin flow network in the central core elements may alternatively be used to also guide the second resin into the first and second main laminates via the opposite facing side edges, as described later. This allows for a more uniform introducing of resin into the first and second main laminates.

An object of the present invention is also achieved by a wind turbine blade manufactured as described above, the wind turbine blade extending from a blade root to a tip end in a longitudinal direction and further from a leading edge to a trailing edge in a chordwise direction, the wind turbine blade comprises at least one blade shell part having an outer side surface and an inner side surface, the at least one blade shell part comprises a sandwich structure having a first number of layers of a first fibre material, a central core element, at least two side core elements and a second number of layers of a first fibre material, wherein the central core element are spaced apart from the at least two side core elements to form a first recess and a second recess, wherein a first main laminate is arranged inside the first recess and a second main laminate is arranged inside the second recess, characterised in that said second number of layers of a first fibre material extends along the central core element, the least two side core elements and further along the first number of layers within the first and second recesses.

The present method may suitably be used to manufacture wind turbine blades having a blade length equal to or greater than 35 meters, preferably equal to or greater than 50 meters. The present method may suitably be used to manufacture wind turbine blades having a split main laminate. The central core elements are suitably used to correctly align the individual layers of the main laminates during the lay-up process. This reduces the risk of wrinkles forming in the main laminates.

The wind turbine blade may be a full-span blade or a modular blade comprising at least blade sections configured to be jointed together. The wind turbine blade may comprise at least two blade shell parts which together form the aerodynamic profile or body of the wind turbine blade. Each blade shell part comprises a sandwich structure wherein a first and a second main laminate are integrated into the blade shell. The central and side core elements form a first and a second recess in which the first and second main laminates are positioned. The first and second main laminates form part of the load-carrying structure.

The inner and outer skins of the sandwich structure extend over the individual core elements and further along each other in the first and second recesses. The inner and outer skins thereby form a combined skin or laminate in said first and second recesses. The first and second main laminates are attached to at least the opposite side surfaces and the bottom side of the first and second recesses. This allows for a firm attachment between the main laminates and the rest of the blade shell part.

Optionally, an inner skin of the first and/or second main laminate may extend partly over the inner skin of the sandwich structure. The inner skin may be formed by one or more layers of a second fibre material, as described below. The inner skin may be formed by a single continuous element or multiple elements extending along the length of the respective main laminate. The inner skin may suitably be used to attach the main laminate to the inner surface of the sandwich structure. Alternatively, the inner skin may function as a glue barrier during the attachment.

According to one embodiment, at least one of the first and second main laminates comprises a plurality of layers of a second fibre material infused with a second resin.

One or both of the first and second main laminates may comprise a plurality of layers of a second fibre material arranged in a stacked configuration. The layers may thus form a laminate of second fibre material. The layers may optionally also form an intermediate skin or installation flange, as mentioned later. The layers may be impregnated with a second resin and then cured, as described earlier.

According to one embodiment, said first and second main laminates are interconnected by at least one intermediate skin or installation flange extending over the top side of the central core element.

One or more uppermost layers of the above laminate may form an inner skin. For example, one, two, three or more layers may form the inner skin. The inner skin may extend over the width of the main laminate and further partly over the inner surface of the sandwich structure. The inner skin may form a number of first installation flanges facing towards the central core element and a number of second installation flanges facing towards the side core elements. The individual first installation flanges of the first and second main laminates may be aligned or offset in the longitudinal direction. The first installation flanges of the first main laminate may abutted or intersect with the first installation flanges of the second main laminate, thereby partly or fully covering the inner skin over the central core elements. This increases the total attachment area. The individual first and second installation flanges may also function as glue barriers during the attachment.

The first and second installation flanges may be interconnected to form a plurality of intermediate skin portions or an intermediate skin extending over the entire central core elements. The intermediate skin or skin portions may comprise at least one layer of second fibre material. This configuration may be suitable for very narrow central core elements. This allows the second resin to flow from a central inlet to both main laminates or from both main laminates to a central outlet.

The first and second main laminates may each have a bottom side, a top side and opposite facing edge surfaces. For example, the top side surface may be substantially flushed with the adjacent inner surface of the sandwich structure. Alternatively, the top side may form a projecting portion extending from the adjacent inner surface of the sandwich structure. An adjoining portion of the second layer may have a tapered profile which tapers from the main laminate towards the leading or trailing edge. This may be achieved by adding one or more additional layers in inner skin. Alternatively, the adjoining side core element may have a tapered profile which tapers from the main laminate towards the leading or trailing edge. Thereby, providing a smooth transition between the main laminate and the sandwich structure.

The edge surfaces may face the central core elements and the side core elements respectively. For example, a first edge surface of the first main laminate may face a second edge surface of the second main laminate. Said first and second edge surfaces of each main laminate may be shaped to form a tapered or inclined edge profile. This allows for increased stiffness and an optimal stress transfer from the main laminate to the rest of the blade shell part.

According to one embodiment, said first resin is equal to said second resin, and/or said first fibre material is equal to said second fibre material.

The first resin may for example be equal to the second resin so that the same resin may be used to impregnate the fibre material in both the sandwich structure and the main laminates. This allows the first and second resin to have the same adhesive properties for adhering to the first and second fibre materials respectively.

The first resin may for example differ from the second resin, thus two types of resin may be used to manufacture the sandwich structure and the main laminates. For example, the first resin may be a resin which cures through a catalytic chemical reaction. The first resin may be a polyester or vinylester based resin. For example, the second resin may be a resin which cures by applying heat, such as an epoxy based resin. Other types of heat curing or heat activated resins may be used.

The first fibre material may for example be equal to the second fibre material so that the same fibre material may be used in both the sandwich structure and the main laminates. This allows the first and second fibre material to have the same structural properties. The first fibre material may for example differ from the second fibre material, thus two types of fibre materials may be used to manufacture the sandwich structure and the main laminates. This allows for an increased structural strength For example, the first and/or second fibre material may comprise fibres made of glass, carbon or aramid. Alternatively, the first and/or second fibre material may comprise a mixture of fibres, such as a mixture of glass and carbon. For example, the first and/or second fibre material may comprise unidirectional fibres, multi-axial fibres, tri-axial fibres, biaxial fibres or other fibre orientations or a combination thereof.

According to one embodiment, the central core element has a top side, a bottom side and two opposite edge surfaces, wherein the central core element comprises an integrated resin flow network configured to guide uncured resin from a central inlet and along the central core element, optionally, further into the first and second main laminates.

The central core elements extend in the longitudinal direction from a first local end to a second local end. For example, the first local end may be located at the first end or placed at a predetermined distance from the first end. For example, the second local end may be located at the second end or placed at a predetermined distance from the second end. The central core element further has a first and a second edge surface, wherein one or both edge surfaces may be shaped to form a tapered or inclined edge profile. For example, the central core element may have a substantially trapezoid cross-sectional profile. This allows for an easier manufacture of the blade shell part.

The central core elements may each comprise at least one integrated resin flow network extending between the opposite edge surfaces and/or the opposite ends of the central core element. For example, a first resin flow network may be arranged in the top side and a second resin flow network may be arranged in the bottom side, as described earlier. The resin flow network may be configured to distribute uncured resin, e.g. the first or second resin, along the central core element and further into the first fibre material and e.g. also into the second fibre material. The resin may be fed through a central inlet located above the central core element and out of an outlet, e.g. located above the side core element. This allows for a uniform distribution of resin over the central elements. This reduces the risk of delamination of the central sandwich structure or the central core elements thereof.

The first side core elements extend in the longitudinal direction from a first local end to a second local end and further in the chordwise direction from a first local edge facing the central core elements to a second local edge facing the leading edge. The second side core elements extend in the longitudinal direction from a first local end to a second local end and further in the chordwise direction from a first local edge facing the central core elements to a second local edge facing the trailing edge. Each side core element further has a first and a second edge surface. One or both edge surfaces facing the central element of the first and second side core elements may be shaped to form a tapered or inclined edge profile. This further allows for an easier manufacture of the blade shell part.

Similarly, the side core elements may each comprise at least one integrated resin flow network extending between the opposite edge surfaces and/or the opposite ends of the central core element. This resin flow network may be configured to distribute uncured first resin along the side core element and further into the first fibre material. The first resin may be fed through one or more inlets located above the side core elements and out of one or more outlets located above the side core elements. This allows for a uniform distribution of resin over the central elements. This reduces the risk of delamination of the side sandwich structure or the side core elements thereof.

The central core elements and/or the side core elements may be made of balsa wood, a foam material or another suitable light-weight material. For example, the foam material may be polystyrene, polyurethane, polyethylene, polypropylene, polycinyl chloride (PVC), cellulose acetate or nylon.

According to a special embodiment, the resin flow network comprises a number of grooves formed in at least one of the top side, the bottom side and the two opposite edge surfaces.

The above mentioned resin flow network may be manufactured by CNC machining of the respective core elements. The resin flow network may be formed as grooves having a constant or variable depth. This allows for a simple and easy manufacture of the resin network.

For example, the side core elements facing the central core element may comprise grooves arranged in the top side, bottom side and in one or both edge surfaces. Similarly, the central core elements may comprise grooves arranged in the top side, bottom side and in the edge surfaces. Alternatively, the central core elements may comprise first grooves arranged in the top side and part of the edge surfaces and second grooves arranged in the bottom side and part of the edge surfaces. The first and second grooves may be separated from each other to enable independent resin flow.

Alternatively, the resin flow networks may be embedded tubes or internally formed channels connected to a plurality of inlet openings and outlet openings arranged in the exterior surfaces of the core elements. Other configurations of the resin flow networks may be used.

According to a further special embodiment, a resin permeable element is arranged inside at least one of said number of grooves.

The flow of first and/or second resin may be further enhanced by means of permeable elements arranged in the above resin flow network, e.g. grooves. The permeable element may be formed as a strip, fabric or mesh of a permeable material. The permeable material may be made of polyester, polystyrene, nylon, polyether, polyvinyl acetate (PVA) or another suitable permeable or porous material. This further facilitates the distribution of resin as it allows the resin to be guided in the desired longitudinal and/or chordwise direction.

Optionally, one or more flow medium or flow distributing layers may be arranged on the first and/or second layers of first fibre material for facilitating the infusion process of the first resin. Alternatively or additionally, one or more flow medium or flow distributing layers may be arranged on the layers of second fibre material for facilitating the infusion process of the second resin. For example, a flow medium or a flow distributing layer may extend over the inner surface of each main laminate component. For example, a flow medium or a flow distributing layer may extend over the inner surfaces of the first and second main laminate components and further over the inner surface of the core element.

DESCRIPTION OF DRAWINGS

The invention is explained in detail below with reference to embodiments shown in the drawings, in which.

LIST OF REFERENCES

Figure 1:
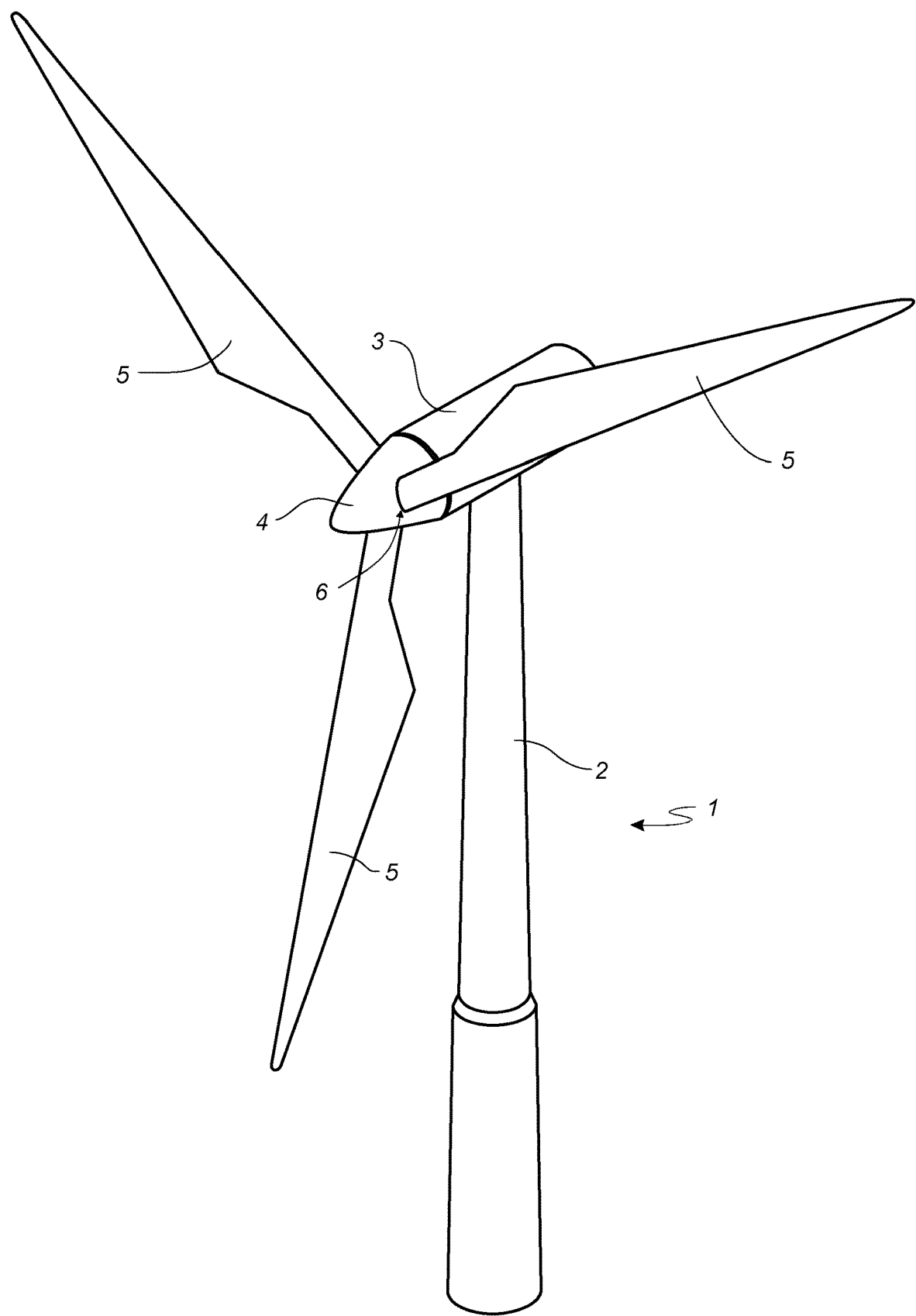
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Blade shell part
20. First number of layers of first fibre material
21. Blade mould
22. Moulding surface
23a-b. Side core elements
23c Central core element
24a-b. Recesses
25. Second number of layers of first fibre material
26. Trailing edge reinforcement
27. Blade support cradle
28a-b. Main laminates
29. Gap
30a-b. Shear webs
31. Main laminate mould
32. Moulding surface
33. Layers of second fibre material
34. Bottom side of main laminate
35. Top side of main laminate
36. Edge surfaces
37a-b. Installation flanges
38. Inlets
39. Outlets
40. Vacuum bag
41. Resin permeable element
42. Central groove
43. Transverse grooves The listed reference numbers are shown in abovementioned drawings where not all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the rotor may comprise more or fewer wind turbine blades 5. The hub 4 is connected to a drive train, e.g. a generator, located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
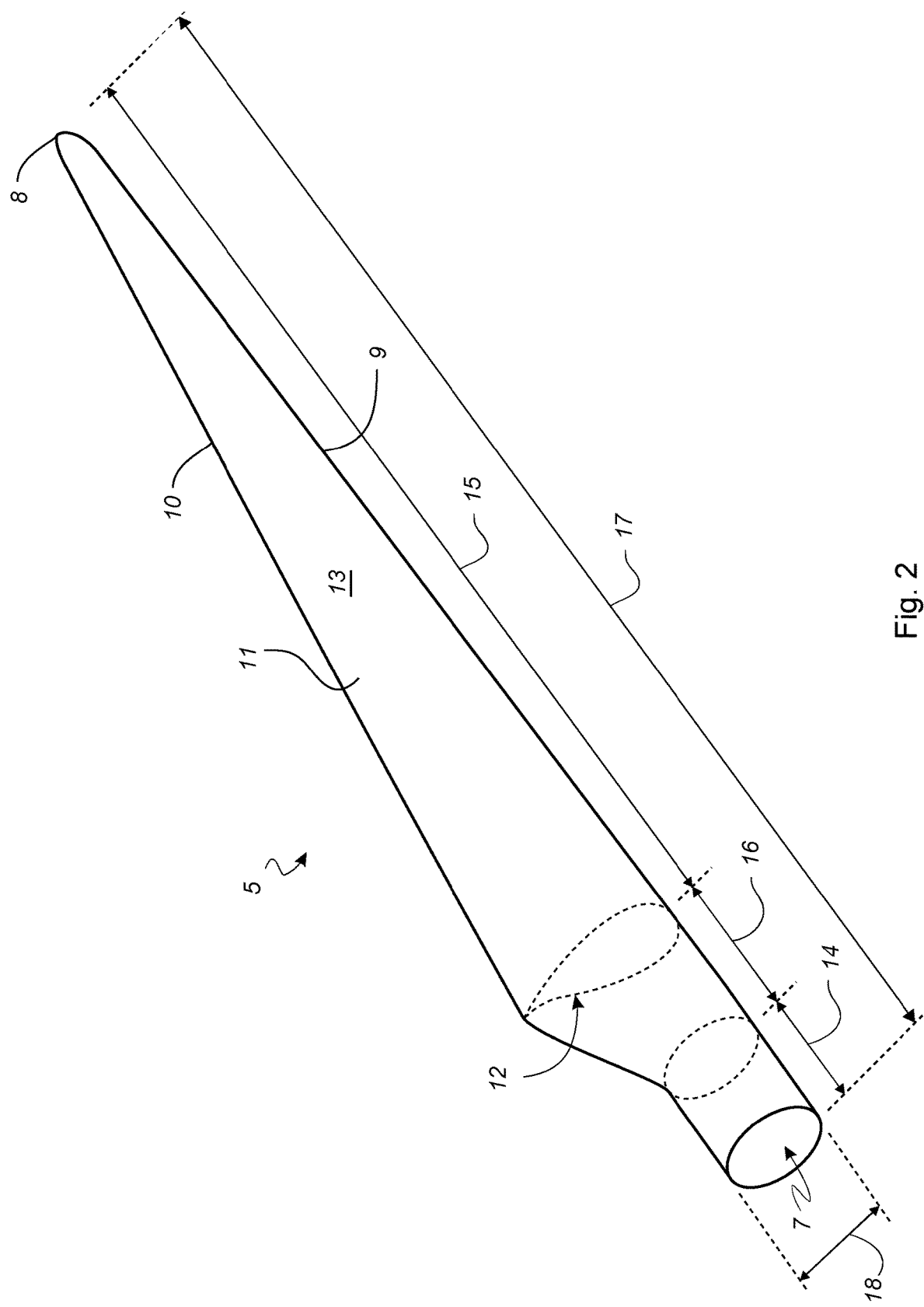
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a longitudinal length 17 of at least 35 metres, preferably at least 50 metres. The wind turbine blade 5 further has a chord length 18 as function of the length 17, wherein the maximum chord length is found between the blade aerodynamic blade portion 15 and the transition portion 16. The wind turbine blade 5 further has a blade thickness 19 as function of the chord length 18, wherein the blade thickness 19 is measured between the pressure side 12 and the suction side 13.

Figure 3:
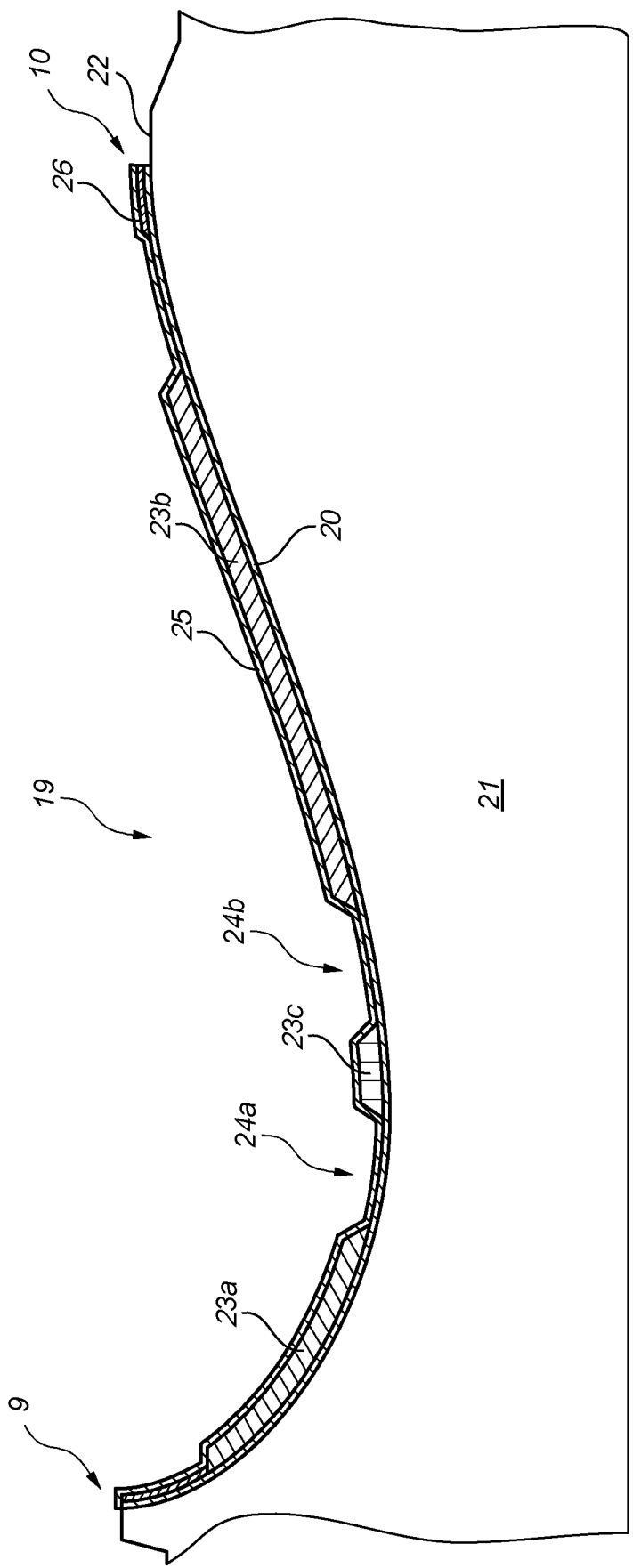
FIG. 3 shows an exemplary embodiment of an aerodynamic portion of a blade shell part after first curing.

FIG. 3 shows an exemplary embodiment of an aerodynamic portion of a blade shell part 19 arranged in a blade mould 21 after first curing. The blade shell part 19 comprises a number of first layers 20 of a fibre material extending along a mounting surface 22. A number of first and second side core elements 23a, 23b are arranged on the layers 20 relative to the trailing and leading edges 9, 10 of the blade shell part.

A number of central core elements 23c are further arranged on the layers 20 between the first and second side core elements 23a, 23b. The central core element 23c is spaced apart from the first and second side core elements 23a, 23b to form a first recess 24a and a second recess 24b for receiving main laminates of a load carrying structure (shown in FIGS. 4-5).

A number of second layers 25 extend along the respective core elements 23a-c and further along the first layers 20 in the respective gaps 24a-b, as indicated in FIG. 3.

Optionally, trailing edge reinforcement 26 is further arranged between the first and second layers 20, 25 for adding strength to the trailing edge 10. Leading edge reinforcement (not shown) may also be arranged between the first and second layers 20, 25 for adding strength to the leading edge 9.

Figure 4:
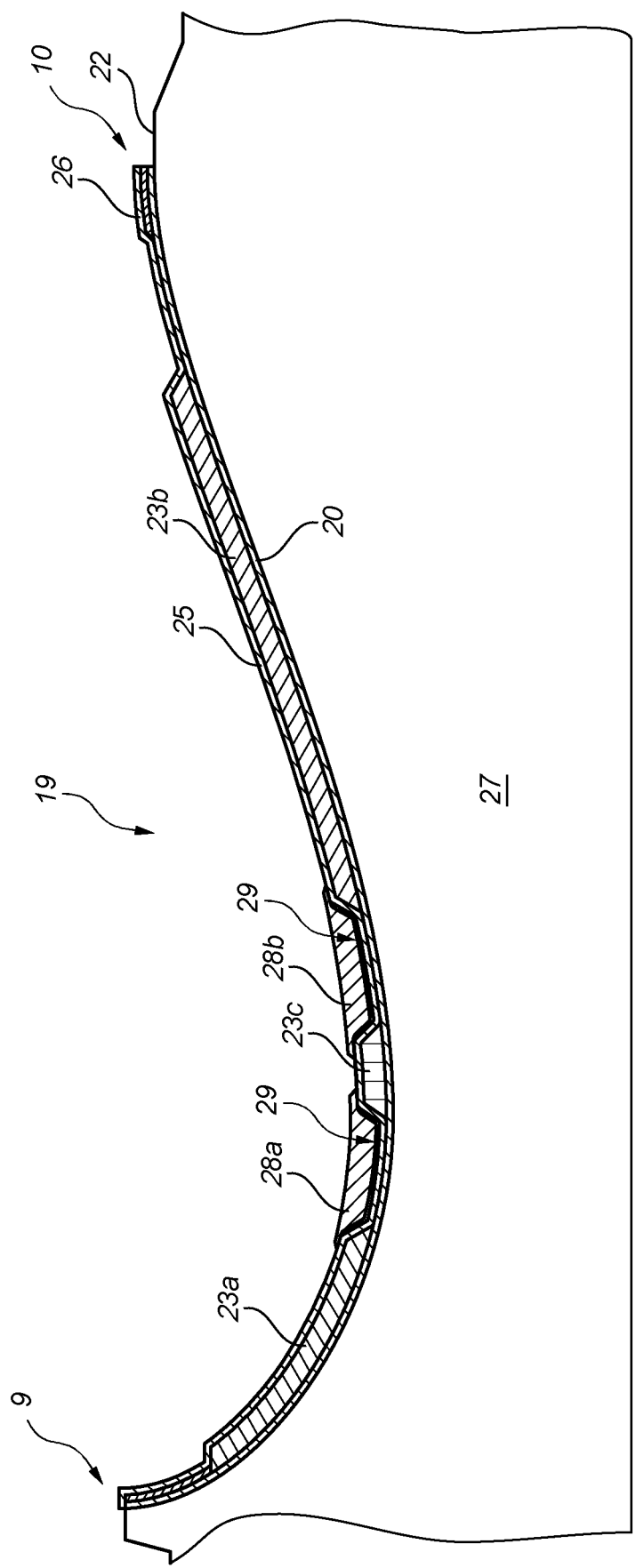
FIG. 4 shows the blade shell part after second curing with a first embodiment of the load carrying structure.

FIG. 4 shows the blade shell part 19 after second curing with a first embodiment of the load carrying structure arranged in the first and second gaps 24a-b. Here, the blade shell part 19 is arranged in a blade support cradle 27.

The load carrying structure comprises a first main laminate 28a arranged in the first recess 24a and a second main laminate 28b arranged in the second recess 24b. A gap 29 is formed between the inner surface of the second layers 25 and the respective bottom surfaces of the first and second main laminates 28a-b. The first and second main laminates 28a-b are attached to the rest of the blade shell part 19 via an adhesive arranged in the gaps 29.

Figure 5:
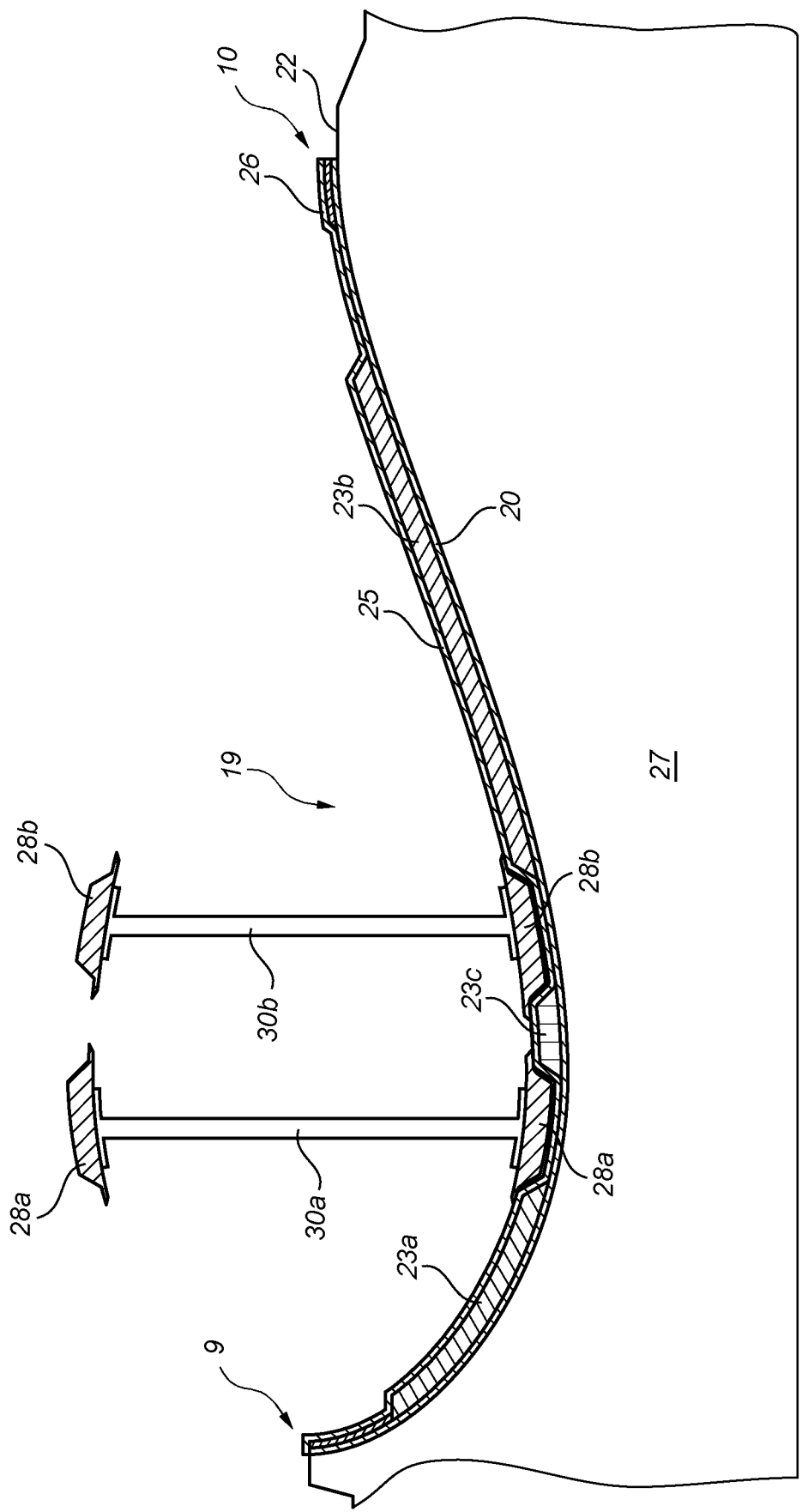
FIG. 5 shows the blade shell part after second curing with a second embodiment of the load carrying structure.

FIG. 5 shows the blade shell part 19 after second curing with a second embodiment of the load carrying structure. Here, the blade shell part 19 is arranged in the blade support cradle 27.

A first shear web 30a of the load carrying structure is integrally formed with the first main laminate 28a. Similarly, a second shear web 30b of the load carrying structure is integrally formed with the second main laminate 28b. Another first and second main laminate 28a-b are further integrally formed with the first and second shear webs 30a-b at the other end, thereby forming an integrated load carrying structure.

Figure 6:
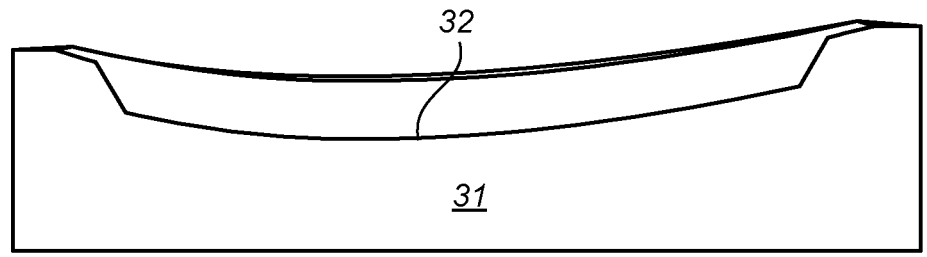
FIG. 6 shows an exemplary embodiment of a main laminate mould.

FIG. 6 shows an exemplary embodiment of a main laminate mould 31 for manufacturing the first and second main laminates 28a-b separately from the blade mould 21. The main laminate mould 31 has a moulding surface 32 defining the bottom surface of the first and second main laminates 28a-b.

Figure 7:
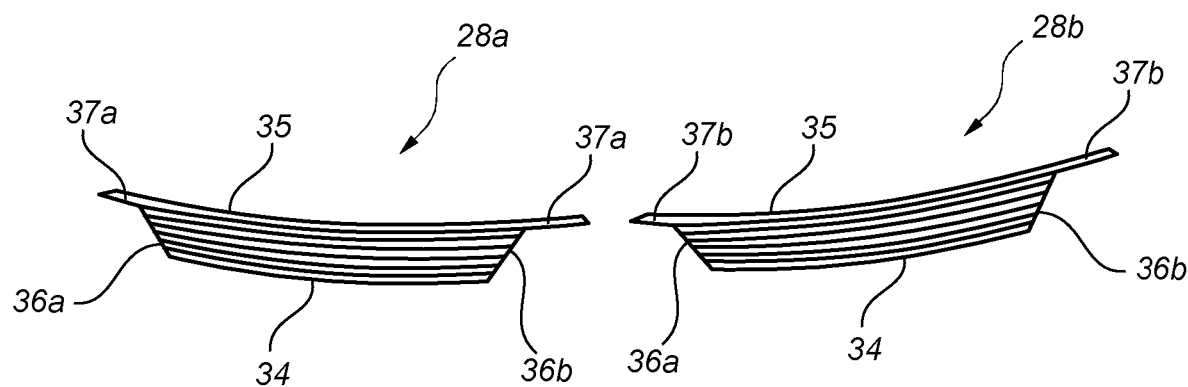
FIG. 7 shows a first embodiment of the first and second main laminates.

FIG. 7 shows a first embodiment of the first and second main laminates 28a-b, wherein the first and second main laminates 28a-b are manufactured individually as separate components.

The first and second main laminates 28a-b each comprises a plurality of layers 33 of a second fibre material arranged in a stacked configuration. Lowermost layers of the stack define a bottom side 34 and uppermost layers of the stack define a top side 35. The stack further has a first edge surface 36a facing the first or second side core element 23a, 23b and a second edge surface 36b facing the central core element 23c.

The first and second edge surfaces 36a-b are here tapered relative to the top or bottom surface 34, 35 so that they form a tapered edge profile. This allows for optimal load transfer and easier positioning in the first and second recesses.

The uppermost layers of the respective main laminate 28a-b project beyond the edge surfaces 36a-b to form two installation flanges or resin stops. The first installation flange 37a projects from the first edge surface 36a for contacting the side core element 23a, 23b and the second installation flange 37b projects from the second edge surface 36b.

Figure 8:
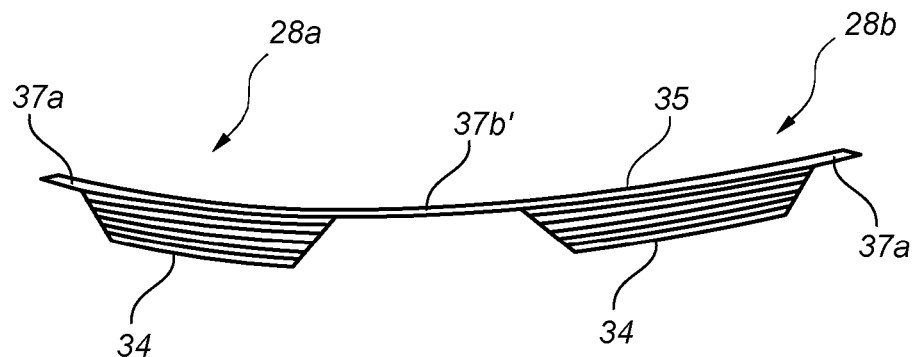
FIG. 8 shows a second embodiment of the first and second main laminates.

FIG. 8 shows a second embodiment of the first and second main laminates 28a-b, wherein the opposite facing second installation flanges 37b of the first and second main laminates 28a-b form a combined installation flange 37b'. This combined installation flange 37b' extend over the width of the central core element 23c. This allows for easier handling of the two main laminates.

Figure 10:
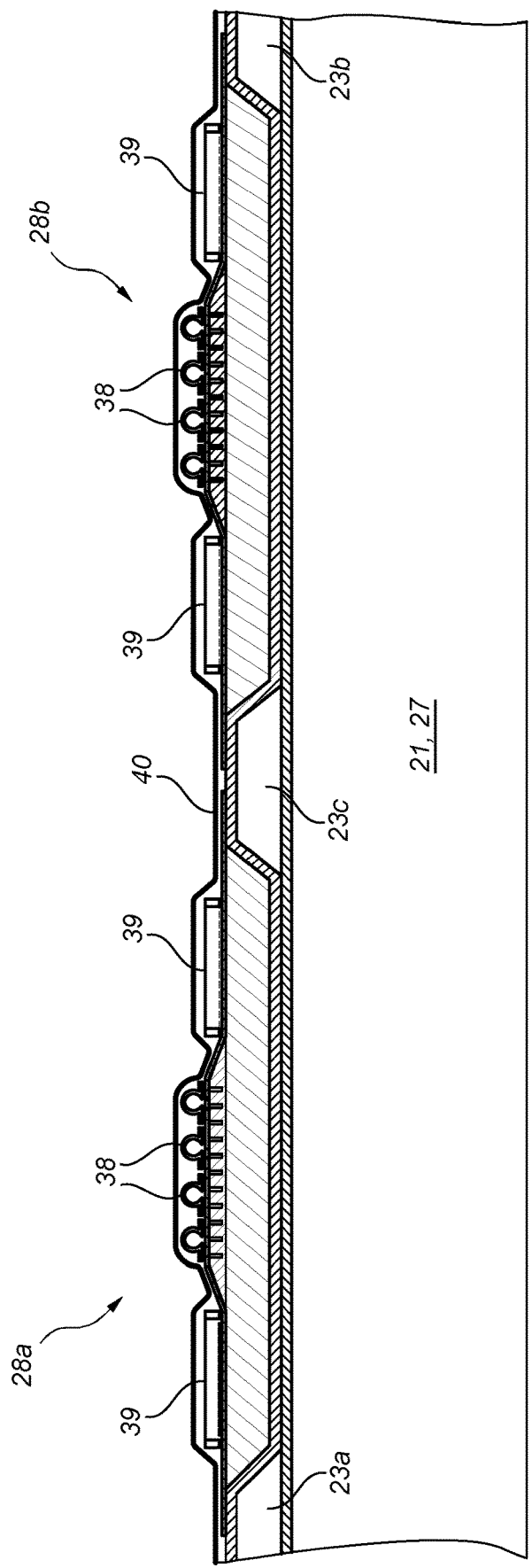
FIG. 10 shows a first embodiment of a second manufacturing step of the blade shell part.
Figure 11:
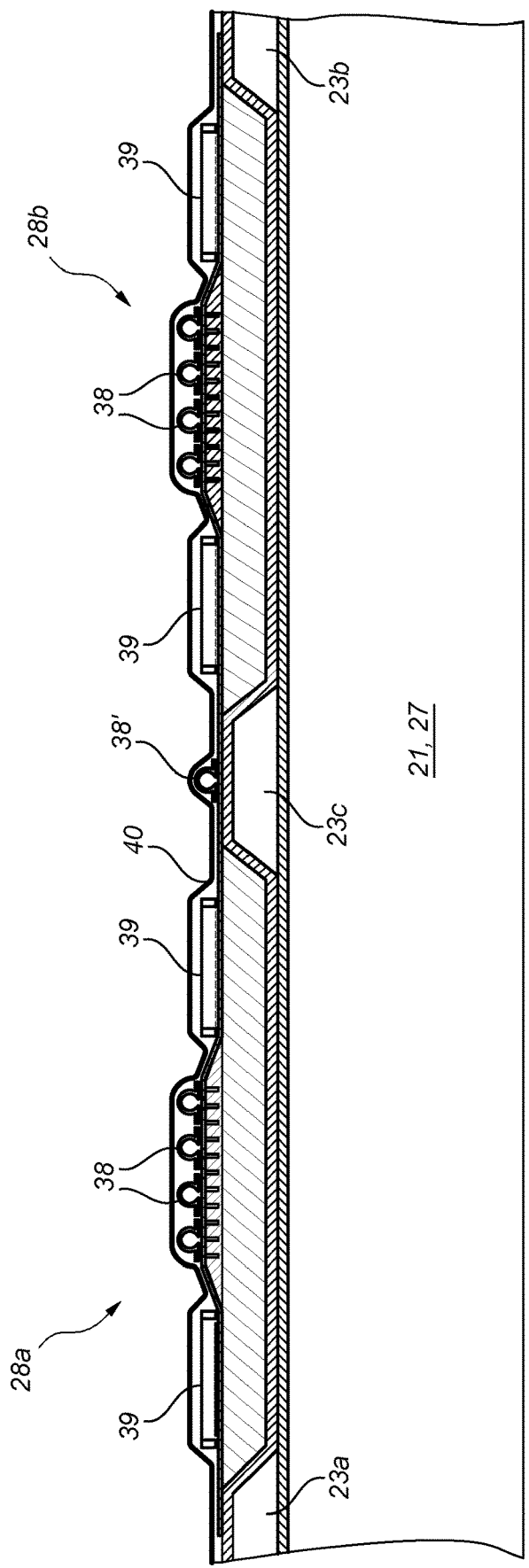
FIG. 11 shows a second embodiment of the second manufacturing step.

Alternatively, the installation flanges 37a, 37b, 37b' can omitted and the top side 35 of the main laminate are substantially flushed with the inner surface of the side and central elements 23a-c, as indicated in FIGS. 10-11.

Figure 9:
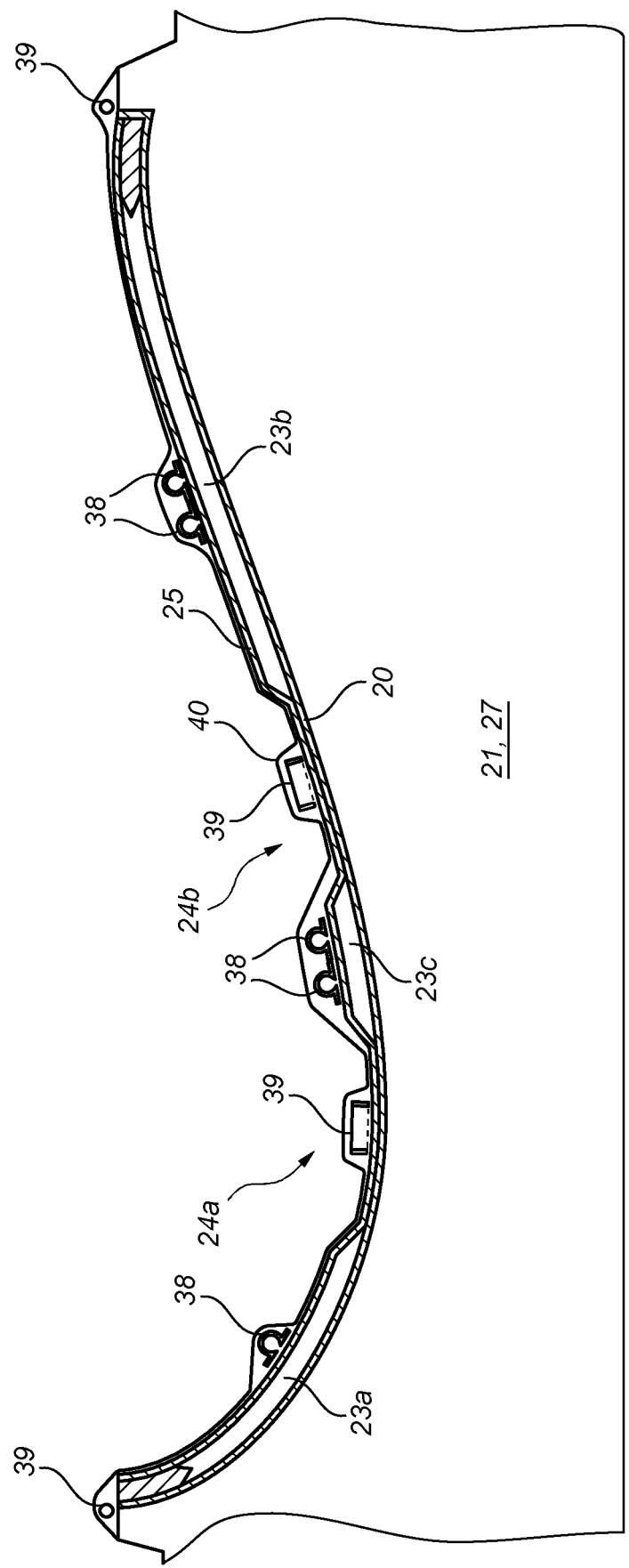
FIG. 9 shows a first manufacturing step of the blade shell part.

FIG. 9 shows a first step of manufacturing the blade shell part 19, wherein the first layers 20 of the first fibre material are initially laid up on the moulding surface 22. The side core elements 23a-b and the central core element 23c are then arranged on top of the layers 20. The second layers 25 of the first fibre material are afterwards laid up over the respective side and central core elements 23a-c and further along the first layers 20 in the first and second recesses 24a-b to form a sandwich structure.

A number of inlets 38 and a number of outlets 39 are positioned on the sandwich structure and the entire structure is covered with a vacuum bag 40. A first resin is then introduced into the first fibre material and the core material using a vacuum infusion system. Excess first resin is guided out of the structure via the outlets 39. The first resin is finally cured in a first curing step to form the aerodynamic portion of the blade shell part 19.

Once cured, the aerodynamic portion of the blade shell part 19 may transferred to the blade support cradle 27 or remain in the blade mould 21.

FIG. 10 shows a first embodiment of a second manufacturing step of the blade shell part 19. Here, the first and second main laminates 28a-b are laid up and cured directly in the first and second recesses 24a-b.

The layers 33 of the first main laminate 28a are laid up in the first recess 24a using the edge surfaces of the recesses to align accurately the individual layers to form the stack.

The stack of second fibre material is then covered with another vacuum bag 40 and the second resin is introduced into the second fibre material using another vacuum infusion system. Excess second resin is guided out of the structure via the outlets 39. The second resin is then cured in a second step to attach the first main laminate 28a to the rest of the blade shell part 19.

The process is repeated for manufacturing of the second main laminate 28b.

FIG. 11 shows a second embodiment of the second manufacturing step, wherein the first and second main laminates 28a-b are infused with the second resin simultaneously via a central inlet 38' and the inlets 38. The central inlet 38' is arranged above the central core element 23c and the second resin is led into the first and second main laminates 28a-b via their opposite facing edge surfaces.

In this configuration, the inlets 38 arranged above the first and second main laminates 28a-b may be omitted. Alternatively or additionally, the innermost outlets 39 arranged above the first and second main laminates 28a-b and closest to the central inlet 38' may be omitted.

Figure 12:
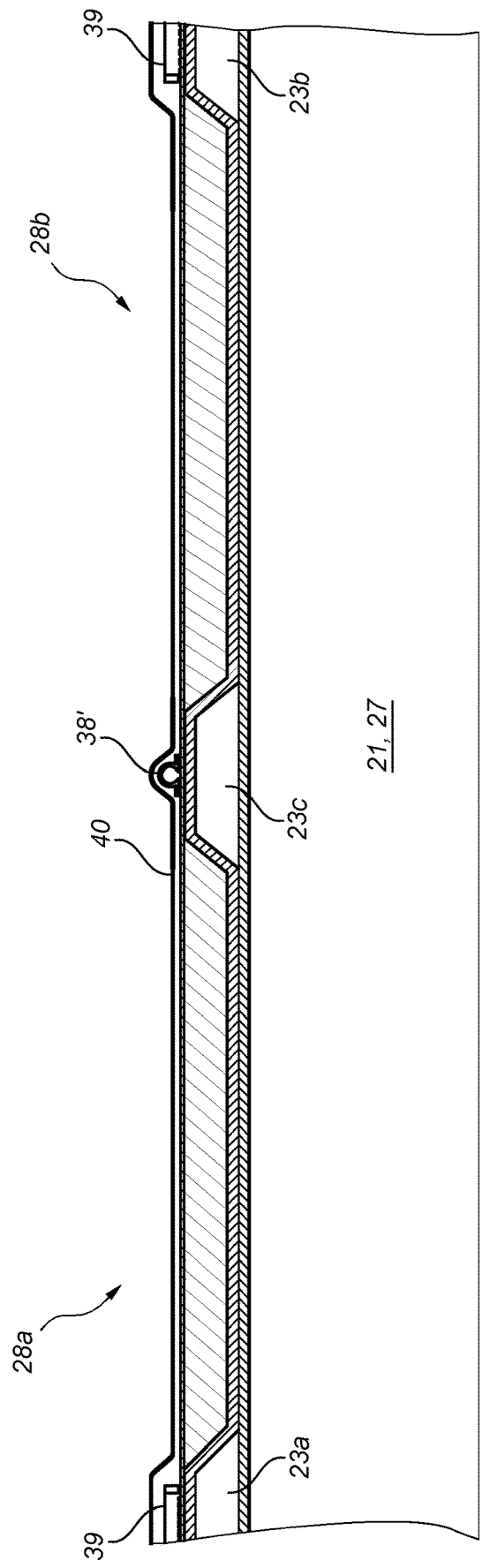
FIG. 12 shows a third embodiment of the second manufacturing step.

FIG. 12 shows a third embodiment of the second manufacturing step, where no inlets or outlets are arranged on the inner surfaces of the first and second main laminates 28ab.

In this configuration, the first and second main laminates 28a-b are infused with the second resin simultaneously via a central inlet 38'. The central inlet 38' is arranged above the central core element 23c and the second resin is led into the first and second main laminates 28a-b via their opposite facing edge surfaces.

Excess second resin is guided out of the structure via the outlets 39. The outlets 39 are arranged above the side core elements 23a-b adjacent to the first and second main laminates 28a-b.

Figure 13:
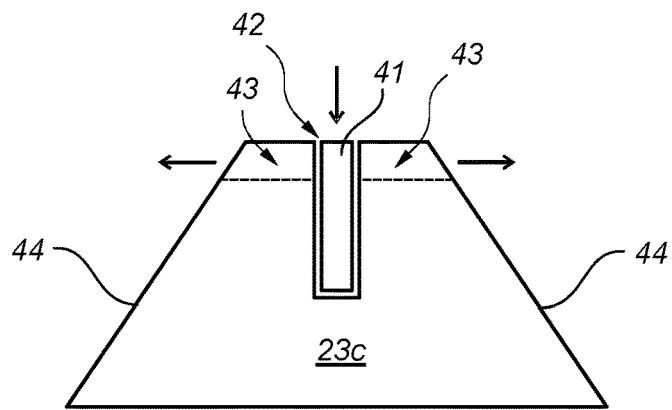
FIG. 13 shows a cross-section of a first embodiment of the central core element with a resin permeable element.

FIG. 13 shows a cross-section of a first embodiment of the central core element 23c with a resin permeable element 41 arranged in a central groove 42. The central groove 42 is connected to an inlet opening formed in the top side of the central core element 23c. The central groove 42 is further interconnected to a plurality of grooves 43 extending the chordwise or transverse direction. The individual grooves 43 are finally connected to an outlet opening formed in the edge surface 44 of the central core element 23c.

The central core element 23c here has a trapezoid profile, wherein the edge surfaces 44 are shaped as tapered edge surfaces which tapered from the bottom side towards the top side.

Resin, e.g. the second resin, is introduced into the central core element 23c via the top side, as indicated by the arrows. The resin is then guided through the grooves 42, 43 and out of the edge surfaces 44, as further indicated by the arrows. This allows for a uniform introduction of resin into the first and second main laminates 28a-b.

The resin permeable element 41 is configured to facilitate flow of resin inside the respective grooves 42, 43. Here, the resin permeable element 41 is shaped as a mesh.

Figure 14:
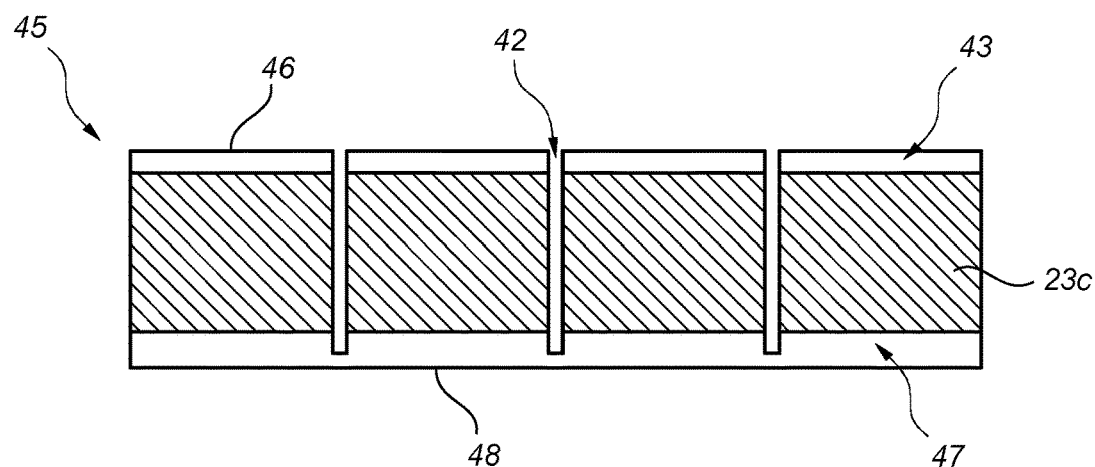
FIG. 14 shows a cross-section of a second embodiment of the central core element with an integrated resin flow network.

FIG. 14 shows a cross-section of a second embodiment of the central core element 23c with an integrated resin flow network 45. The grooves 43 arranged in the top side 46 form a first part of the resin flow network 45.

A second set of grooves 47 is arranged on the bottom side 48 of the central core element 23c. These grooves 47 are interconnected to the central groove 42 and further to another set of outlet openings arranged in the edge surfaces 44. These grooves 47 forms a second part of the resin flow network 45. The first and second parts of the resin flow network 45 are interconnected via the central core elements 42.

Figure 15:
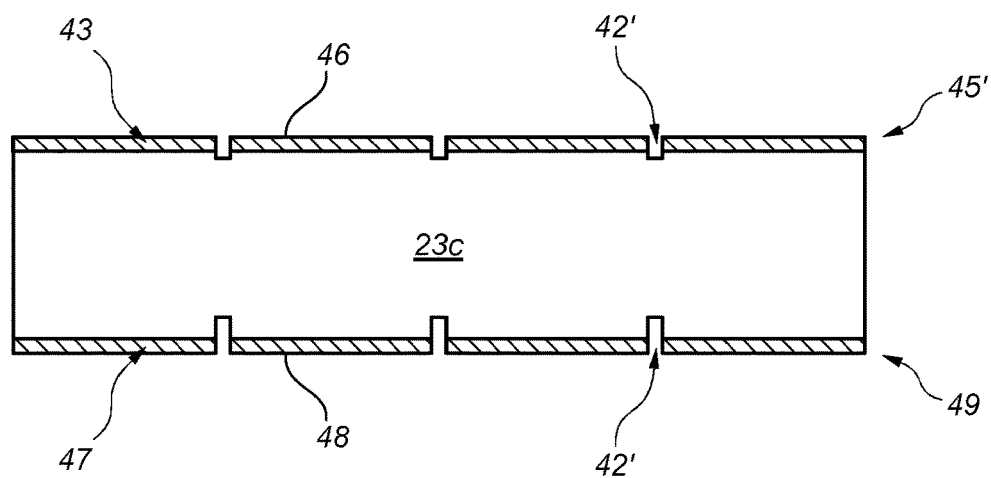
FIG. 15 shows a cross-section of a third embodiment of the central core element with a first and a second resin flow network.

FIG. 15 shows a cross-section of a third embodiment of the central core element 23c with a first resin flow network 45' and a second resin flow network 49. The first resin flow network 45' is arranged in the top side 46 while the second flow network 49 is arranged in the bottom side 48.

Each of the two resin flow networks 45',49 comprises a number of central grooves 42',42" connected to the grooves 43, 47 respectively. Here, the first and second flow networks 45',49 are arranged as separate networks for independent flow of resins.

In one configuration, the first resin is introduced into both the resin flow networks 45',49 during the first manufacturing step. The central core element 23c is fully saturated with the first resin and then at least substantially cured. The second resin is afterwards introduced directly into the two main laminates 28a-b via the inlets 38 during the second manufacturing step and finally cured.

In an alternative configuration, the first resin is introduced into only the second resin flow network 49 during the first manufacturing step. The central core element 23c is thus partly saturated with the first resin which is at least substantially cured. The second resin is afterwards introduced into the first resin flow network 45' via the central inlets 38' and further into the two main laminates 28a-b during the second manufacturing step. The second resin is finally cured. The central core element 23c is thereby saturated with a mixture of the first and second resins.

The abovementioned embodiments may be combined in any combinations without deviating from the present invention.

The invention claimed is:

1. A method of manufacturing a wind turbine blade (5), the method comprising the steps of:
    laying up a number of first layers (20) of a first fibre material in a mould (21), the first layers (20) defining an outer side surface of the wind turbine blade (5);
    arranging a number of core elements of a core material on top of said first number of layers (20);
    further laying up a number of second layers (25) of the first fibre material on top of at least said number of core elements, the second layers (25) defining an inner side surface of the wind turbine blade (5);
    infusing said first fibre material and said core elements with a first resin;
    substantially curing said first resin to form a sandwich structure of the wind turbine blade (5);
    arranging a number of main laminate components in a corresponding number of recesses formed by said number of core elements; and
    attaching said main laminate components to the sandwich structure to form a blade shell part (19) of the wind turbine blade (5),
    wherein a central core element (23c) is arranged between at least two side core elements (23a, 23b),
    wherein said at least two side core elements (23a, 23b) are spaced apart from the central core element (23c) in a chordwise direction to form a first recess (24a) for receiving a first main laminate (28a) component and a second recess (24b) for receiving a second main laminate (28b) component, and wherein said first and second main laminates (28a, 28b) are interconnected by at least one intermediate skin or installation flange (37b') extending over a top side (46) of the central core element (23c).

2. The method according to claim 1, characterised in that at least one of said first and second main laminate (28a, 28b) components comprises a plurality of layers (33) of a second fibre material arranged in a stacked configuration, wherein said at least one of the first and second main laminate (28a, 28b) components is attached by infusing said second fibre material with a second resin and then curing said second resin.

3. The method according to claim 2, characterised in that said plurality of layers (33) of the second fibre material is laid up directly in the first or second recess (24a, 24b).

4. The method according to claim 1, characterised in that at least one of said first and second main laminate (28a, 28b) components is manufactured separately from the wind turbine blade (5) using a main laminate mould (31), and then attached to the sandwich structure using an adhesive.

5. The method according to claim 1, characterised in that the first resin is introduced into at least the central core element via a central inlet (38') channel located between said first and second recesses (24a, 24b).

6. The method according to claim 5, characterised in that said first resin is introduced into the first fibre material via second flow channels integrated into the central core element (23c).

7. The method according to claim 2, characterised in that the second resin is introduced into at least the second fibre material via a central inlet (38') channel located between said first and second main laminate (28a, 28b) components.

8. The method according to claim 7, characterised in that said second resin is introduced into the second fibre material via first flow channels integrated into the central core element (23c).

9. A wind turbine blade (5) manufactured according to claim 1, the wind turbine blade (5) extending from a blade root (7) to a tip end (8) in a longitudinal direction and further from a leading edge (9) to a trailing edge (10) in a chordwise direction, the wind turbine blade (5) comprises at least one blade shell part (19) having an outer side surface and an inner side surface, wherein the at least one blade shell part (19) comprises a sandwich structure having a number of first layers (20) of a first fibre material, a central core element (23c), at least two side core elements (23a, 23b) and a number of second layers (25) of the first fibre material,
wherein the central core element (23c) is spaced apart from the at least two side core elements (23a, 23b) to form a first recess (24a) and a second recess (24b),
wherein a first main laminate (28a) is arranged inside the first recess (24a) and a second main laminate (28b) is arranged inside the second recess (24b),
wherein said second number of layers (25) of the first fibre material extends along the central core element (23c), the least two side core elements (23a, 23b) and further along the first number of layers (20) within the first and second recesses (24a, 24b), and
wherein said first and second main laminates (28a, 28b) are interconnected by at least one intermediate skin or installation flange (37b') extending over a top side (46) of the central core element (23c).

10. The wind turbine blade according to claim 9, characterised in that at least one of the first and second main laminates (28a, 28b) comprises a plurality of layers (33) of a second fibre material infused with a second resin.

11. The wind turbine blade according to claim 10, characterised in that said first resin is equal to said second resin, and/or said first fibre material is equal to said second fibre material.

12. The wind turbine blade according to claim 9, characterised in that the central core element (23c) further has a bottom side (48) and two opposite edge surfaces (44), wherein the central core element (23c) comprises an integrated resin flow network (45) configured to guide uncured resin from a central inlet (38') and along the central core element (23c), optionally, further into the first and second main laminates (28a, 28b).

13. The wind turbine blade according to claim 12, characterised in that the resin flow network (25) comprises a number of grooves (42, 43) formed in at least one of the top side (46), the bottom side (48) and the two opposite edge surfaces (44).

14. The wind turbine blade according to claim 13, characterised in that a resin permeable element (41) is arranged inside at least one of said number of grooves (42, 43).

15. A wind turbine blade (5) manufactured according to claim 1, the wind turbine blade (5) extending from a blade root (7) to a tip end (8) in a longitudinal direction and further from a leading edge (9) to a trailing edge (10) in a chordwise direction, wherein the wind turbine blade (5) comprises at least one blade shell part (19) having an outer side surface and an inner side surface, the at least one blade shell part (19) comprising a sandwich structure having a number of first layers (20) of a first fibre material, a central core element (23c), at least two side core elements (23a, 23b), and a number of second layers (25) of the first fibre material,
wherein the central core element (23c) is spaced apart from the at least two side core elements (23a, 23b) to form a first recess (24a) and a second recess (24b),
wherein a first main laminate (28a) is arranged inside the first recess (24a) and a second main laminate (28b) is arranged inside the second recess (24b),
wherein said second number of layers (25) of the first fibre material extends along the central core element (23c), the least two side core elements (23a, 23b) and further along the first number of layers (20) within the first and second recesses (24a, 24b),
wherein the central core element (23c) has a top side (46), a bottom side (48) and two opposite edge surfaces (44), and wherein the central core element (23c) comprises an integrated resin flow network (45) configured to guide uncured resin from a central inlet (38') and along the central core element (23c), and optionally, further into the first and second main laminates (28a, 28b),
wherein the resin flow network (25) comprises a number of grooves (42, 43) formed in at least one of the top side (46), the bottom side (48) and the two opposite edge surfaces (44), and
wherein a resin permeable element (41) is arranged inside at least one of said number of grooves (42, 43).

* * * * *